No. 759,403. PATENTED MAY 10, 1904.
K. D. STEVENSON.
LADY'S COLLAR SUPPORTER.
APPLICATION FILED DEC. 19, 1903.

NO MODEL.

Witnesses.
John E. Bousfield.
C. G. Reafern.

Inventor.
K. D. Stevenson.

No. 759,403. Patented May 10, 1904.

UNITED STATES PATENT OFFICE.

KATE DRUSILLA STEVENSON, OF EAST ACTON, ENGLAND.

LADY'S COLLAR-SUPPORTER.

SPECIFICATION forming part of Letters Patent No. 759,403, dated May 10, 1904.

Application filed December 19, 1903. Serial No. 185,806. (No model.)

*To all whom it may concern:*

Be it known that I, KATE DRUSILLA STEVENSON, a subject of the King of Great Britain, residing at 7 Churchfield road, East Acton, Middlesex, England, have invented new and useful Improvements in Ladies' Collar-Retainers, of which the following is a specification.

My invention relates to retainers designed for use in connection with lace and other soft collars for ladies' dresses for the purpose of retaining them erect or in an extended position. Hitherto such collars have frequently been mounted upon a frame composed of a band of whalebone or like flexible material fitted into the dress or collar and of a series of upright pieces of whalebone or the like secured to the said band, or separate pieces of stiffening material have been sewed onto the collar.

According to my invention I provide a device which can be applied to or removed from a collar with facility and which serves for retaining the collar in its extended position without the use of a frame or the need for sewing, as heretofore.

My improved device consists of a bent or curved bar of suitable length having at its ends studs, preferably pointed, to enable them to readily perforate the material and adapted to carry ornamental knobs for fastening the device in position, the said knobs being either plain or jeweled or ornamented, as desired.

My invention will be readily understood by reference to the accompanying drawings, in which—

Figure 1:
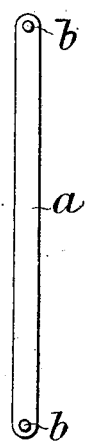
Figure 2:
Figure 3:
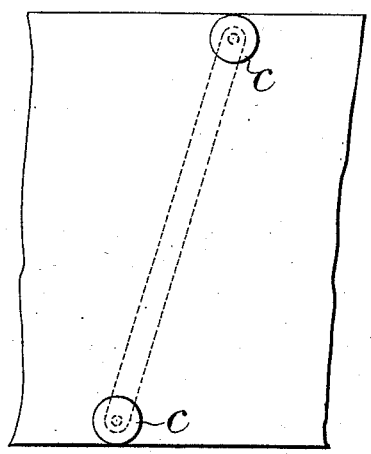
Figure 4:
Figure 5:
Figure 6:
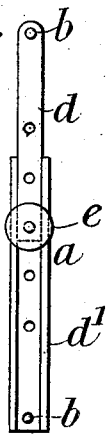
Figure 7:

Figure 1 is a front view of the bar portion and stud of my device, the said device being represented as of a somewhat larger size than would usually be employed in practice. Fig. 2 is a side elevation of the said bar and studs and showing one of the same provided with a knob. Fig. 3 is a view showing the mode of applying the device to a collar. Figs. 4 and 5 are respectively a front and side view of a device of somewhat modified form. Figs. 6 and 7 are similar views illustrating a modification wherein the bar is made adjustable as to length.

$a$ is the bar portion of my device, which may be a plain strip of metal of any suitable section, and $b\ b$ are the studs formed upon or attached to the ends of the said bar, the said studs, as shown in Fig. 2, being screw-threaded and adapted to have knobs, such as $c$, screwed upon them.

In practice the ends of the studs $b\ b$ are advantageously pointed, so that they can be readily passed through the material to which my device is to be applied, and the knobs $c$ can be either plain or jeweled, as desired.

In applying my device the knobs $c\ c$ are removed therefrom, and then the bar is placed in position by passing the points through the fabric from the rear side to the front, the bar being either upright or more or less inclined, as indicated in Fig. 3, according to requirements. When the studs $b\ b$ have been passed through the fabric, the knobs $c\ c$ are applied to retain the device in position. It will be understood that when fixed the only parts of the device which show are the knobs.

It will be obvious, as before stated, that the bar may be of any suitable shape. As shown in Figs. 4 and 5, the bar is represented as being made of wire bent to the shape of a scroll and having the ends turned up and screw-threaded to form the studs $b\ b$.

In order to enable the device to be adjusted for collars of varying width or according to the positions in the collar at which the knobs are to appear, I sometimes make the bar $a$ in two parts $d\ d'$, as shown in Figs. 6 and 7, one of the said bars fitting into a groove or slot in the other bar and the two being adapted to be clamped together by a screw, such as $e$.

Although I have shown the studs as provided with screw-threads and the knobs designed to be screwed upon the said studs, it is to be understood that the studs, if desired, may be formed so that the knobs may be fixed upon them by spring-pressure or by any other suitable means.

Having now particularly described and ascertained the nature of my said invention and in what manner the same is to be performed, I declare that what I claim is—

1. A collar-retainer, consisting of a bar adapted to be placed on the inside of the collar, studs on the said bar adapted to be passed through the material of the collar, and knobs designed to be fixed to the said studs on the outer side of the collar to retain the device in position, substantially as described.

2. A collar-retainer, consisting of a bar designed to lie against the inside of a collar, screw-threaded studs upon the said bar for penetrating the material to which the retainer is applied, and knobs designed to be screwed upon the said studs for retaining the devices in their place, substantially as described.

3. A collar-retainer, consisting of a bar formed in two parts adapted to be moved relatively with one another, a screw or other clamping device for fastening the said two parts in position, a stud upon each part of the said bar and a knob adapted to be fixed upon each of the said studs, substantially as described.

KATE DRUSILLA STEVENSON.

Witnesses:
JOHN E. BOUSFIELD,
C. G. REDFERN.